(12) United States Patent
Iverson et al.

(10) Patent No.: US 9,937,398 B1
(45) Date of Patent: Apr. 10, 2018

(54) GOLF TEE WITH AT LEAST TWO SUPPORT SURFACES

(71) Applicant: Saver Products, LLC, Schaumburg, IL (US)

(72) Inventors: Richard A. Iverson, Lisle, IL (US); Thomas G. White, Arlington Heights, IL (US); David H. Bradley, Hanover Park, IL (US); Lawrence A. Hauck, Schaumburg, IL (US)

(73) Assignee: Saver Products, LLC, Schaumburg, IL (US)

( * ) Notice: Subject to any disclaimer, the term of this patent is extended or adjusted under 35 U.S.C. 154(b) by 0 days.

(21) Appl. No.: 15/401,963

(22) Filed: Jan. 9, 2017

(51) Int. Cl.
*A63B 57/10* (2015.01)
*B29C 45/14* (2006.01)
*B29K 21/00* (2006.01)
*B29L 31/52* (2006.01)

(52) U.S. Cl.
CPC .......... *A63B 57/10* (2015.10); *B29C 45/1418* (2013.01); *B29K 2021/003* (2013.01); *B29L 2031/52* (2013.01)

(58) Field of Classification Search
CPC ......... A63B 57/10; A63B 57/12; A63B 57/13; A63B 57/15; A63B 57/16; A63B 57/18; A63B 57/19; B29C 45/1418; B29L 2031/52; B29K 2021/003
See application file for complete search history.

(56) References Cited

U.S. PATENT DOCUMENTS

| | | | | | |
|---|---|---|---|---|---|
| D71,470 | S | * | 11/1926 | Lugar | 473/402 |
| 1,641,155 | A | * | 9/1927 | Clausing | A63B 57/10 473/402 |
| 1,643,113 | A | * | 9/1927 | Clark | A63B 57/10 473/400 |
| 1,699,934 | A | * | 1/1929 | Warner | A63B 57/10 473/401 |
| 3,559,998 | A | * | 2/1971 | Kelly | A63B 57/10 273/DIG. 4 |
| 4,192,504 | A | * | 3/1980 | Clugage | A63B 57/10 473/257 |
| D258,227 | S | * | 2/1981 | Coonen | D21/718 |
| D271,509 | S | * | 11/1983 | Hanson | D21/718 |
| 4,787,637 | A | * | 11/1988 | Lima | A63B 57/10 473/396 |
| 5,372,362 | A | * | 12/1994 | Barker | A63B 57/207 224/918 |
| 5,720,677 | A | * | 2/1998 | Rudduck | A63B 57/10 473/387 |
| D398,361 | S | * | 9/1998 | DiCesari | D21/717 |
| D482,086 | S | * | 11/2003 | Metz | D21/718 |
| D492,743 | S | * | 7/2004 | Boyarko | D21/717 |
| 7,691,011 | B1 | * | 4/2010 | Roman | A63B 57/10 473/387 |

(Continued)

*Primary Examiner* — Steven Wong
(74) *Attorney, Agent, or Firm* — Brinks Gilson & Lione

(57) ABSTRACT

In one aspect, the present disclosure provides a golf tee. The golf tee may include a shaft having a top end and a bottom end. A cup may be located at the top end of the shaft, the cup may have a concave surface, and the cup may have a rim configured to contact a ball when the golf tee supports the ball. At least one protrusion may extend from the concave surface of the cup, where the protrusion has a surface configured to contact the ball when the golf tee supports the ball.

20 Claims, 4 Drawing Sheets

(56) References Cited

U.S. PATENT DOCUMENTS

| | | | | |
|---|---|---|---|---|
| D695,860 S | * | 12/2013 | Giovanni | D21/717 |
| D789,468 S | * | 6/2017 | McMahan, II | D21/717 |
| 2002/0198066 A1 | * | 12/2002 | Salsman | A63B 57/10 473/387 |
| 2006/0264272 A1 | * | 11/2006 | Calderon | A63B 57/10 473/387 |
| 2006/0276268 A1 | * | 12/2006 | Hung | A63B 57/10 473/387 |
| 2007/0184919 A1 | * | 8/2007 | Costantini | A63B 57/10 473/387 |
| 2008/0039238 A1 | * | 2/2008 | Lee | A63B 57/12 473/400 |
| 2009/0191983 A1 | * | 7/2009 | Otsubo | A63B 57/10 473/396 |
| 2013/0337944 A1 | * | 12/2013 | Lee | A63B 57/00 473/396 |
| 2017/0157477 A1 | * | 6/2017 | Carroll, Jr. | A63B 57/10 |

* cited by examiner

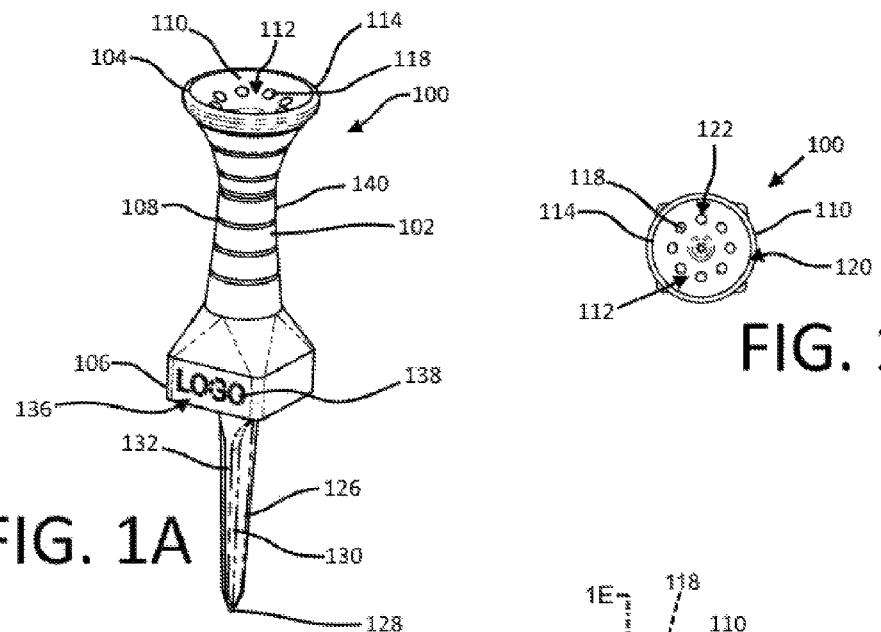
FIG. 1A
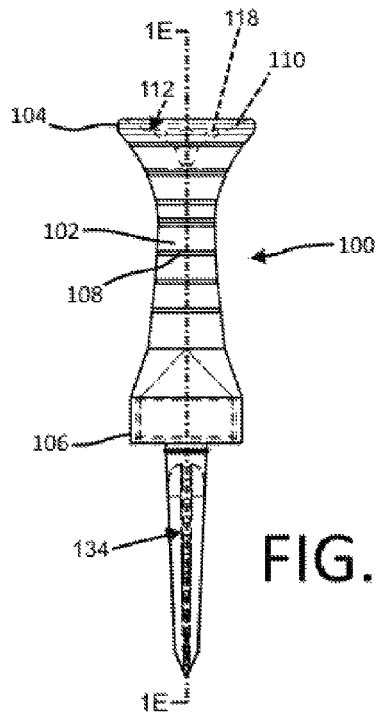
FIG. 1C
FIG. 1B
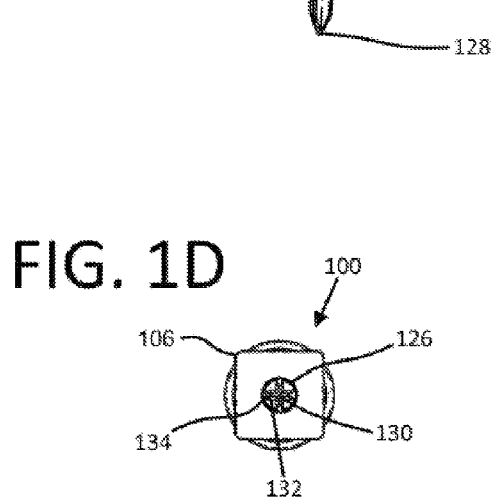
FIG. 1D

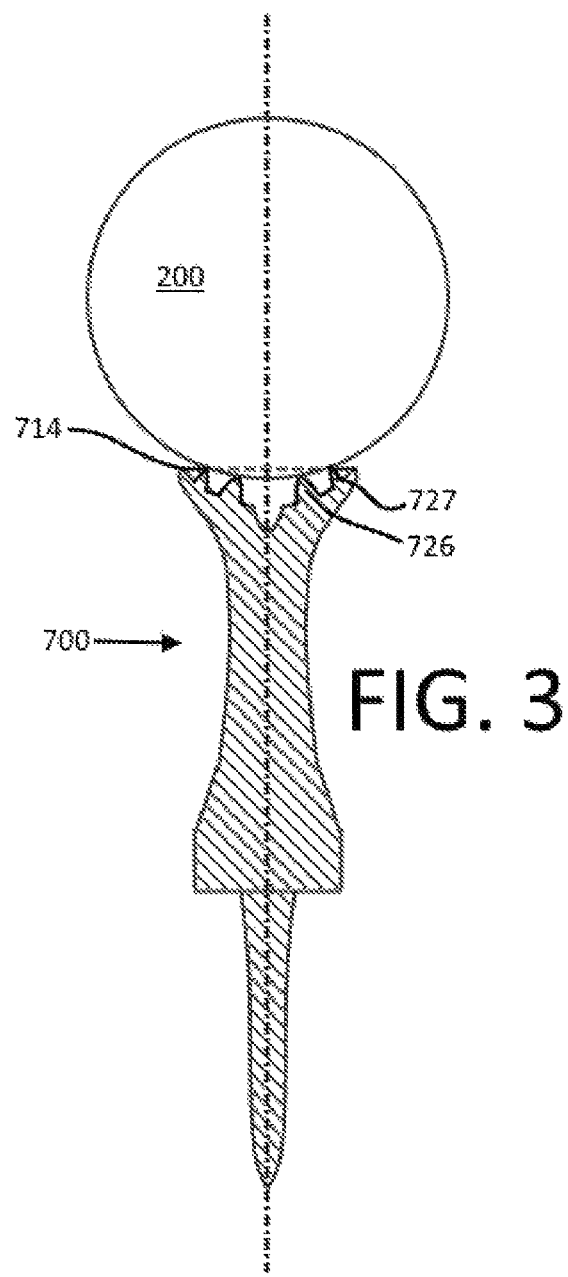

GOLF TEE WITH AT LEAST TWO SUPPORT SURFACES

BACKGROUND

Conventional golf tees have stems designed to be pressed into the ground and ball-supporting heads that are designed to support an elevated golf ball during a tee shot. Typically, the ball-supporting head of the golf tee includes a concave surface that contacts the golf ball when the golf ball is placed on the tee. During a tee shot, friction between the concave surface and an outer surface of the golf ball may affect the spin of the golf ball, which may cause an uncontrollable or undesirable flightpath. It may therefore be advantageous to provide a golf tee with a head having enhanced surface properties to limit unintentional spin.

BRIEF SUMMARY

In one aspect, the present disclosure provides a golf tee having a shaft with a top end and a bottom end. A cup may be located at the top end of the shaft, the cup having a concave surface, and the cup having a rim configured to contact a ball when the golf tee supports the ball. At least one protrusion may extend from the concave surface of the cup, the protrusion having a surface configured to contact the ball when the golf tee supports the ball.

A stem may be located at the bottom end of the shaft, where the stem includes a material that is different than a material of the shaft. The stem may have a central elongated shaft and at least one column extending from the elongated shaft and configured to engage the ground. An end of the at least one column may include a concave notch.

The bottom end of the shaft may include a flat surface, the flat surface being parallel to an axis defined by the shaft. A central portion of the shaft may have a circular cross-sectional shape with at least one indentation extending around the circular cross-section.

At least a portion of the rim may be located a first distance from an axis defined by the shaft, where the at least one protrusion is located a second distance from the axis defined by the shaft, and where the first distance is greater than the second distance.

The concave surface may be configured such that a gap is located between the concave surface and the golf ball when the golf tee supports the golf ball.

In another aspect, a golf tee may include a shaft having a top end and a bottom end. A first support surface may be configured to contact a ball when the golf tee supports the ball. A second support surface configured to contact the ball when the golf tee supports the ball, where the first support surface is located a first distance from an axis defined by the shaft, where the second support surface is located a second distance from the axis defined by the shaft, and where the first distance is greater than the second distance.

The first support surface may be defined by a rim of a cup located at the top end of the shaft, where the cup has a concave surface facing away from the shaft. The second support surface may be defined by a protrusion extending from the concave surface of the cup. A diameter of the rim may be at least 0.50 inches.

The golf tee may further include a stem located at the bottom end of the shaft, where the stem includes a material that is different than a material of the shaft. The stem may include a central elongated shaft and at least one column extending from the elongated shaft and configured to engage the ground. An end of the at least one column includes a concave notch.

The bottom end of the shaft may include a flat surface, the flat surface being parallel to an axis defined by the shaft. A central portion of the shaft may have a circular cross-sectional shape.

In another aspect, the present disclosure provides a method including forming a shaft having a top end and a bottom end, forming a cup located at the top end of the shaft, the cup having a concave surface, and the cup having a rim configured to contact a ball 200 when the golf tee supports the ball, and forming at least one protrusion extending from the concave surface of the cup, the protrusion having a surface configured to contact the ball when the golf tee supports the ball.

The method may also include forming a stem and locating the stem at the bottom end of the shaft. Locating the stem at the bottom end of the shaft may include inserting the stem in a mold before or during an injection molding process, wherein the injection molding process forms the shaft.

BRIEF DESCRIPTION OF THE DRAWINGS

FIG. 1A shows a top perspective view of a golf tee with a cup and a plurality of protrusions in accordance with the present disclosure.

FIG. 1B shows a side elevation view of the golf tee of FIG. 1A.

FIG. 1C shows a top view of the golf tee of FIG. 1A.

FIG. 1D shows a bottom view of the golf tee of FIG. 1A.

FIG. 3 shows a cross-sectional view of an embodiment of a golf tee in accordance with the present disclosure, where a supported golf ball does not contact a rim.

DETAILED DESCRIPTION

Figure 1E:
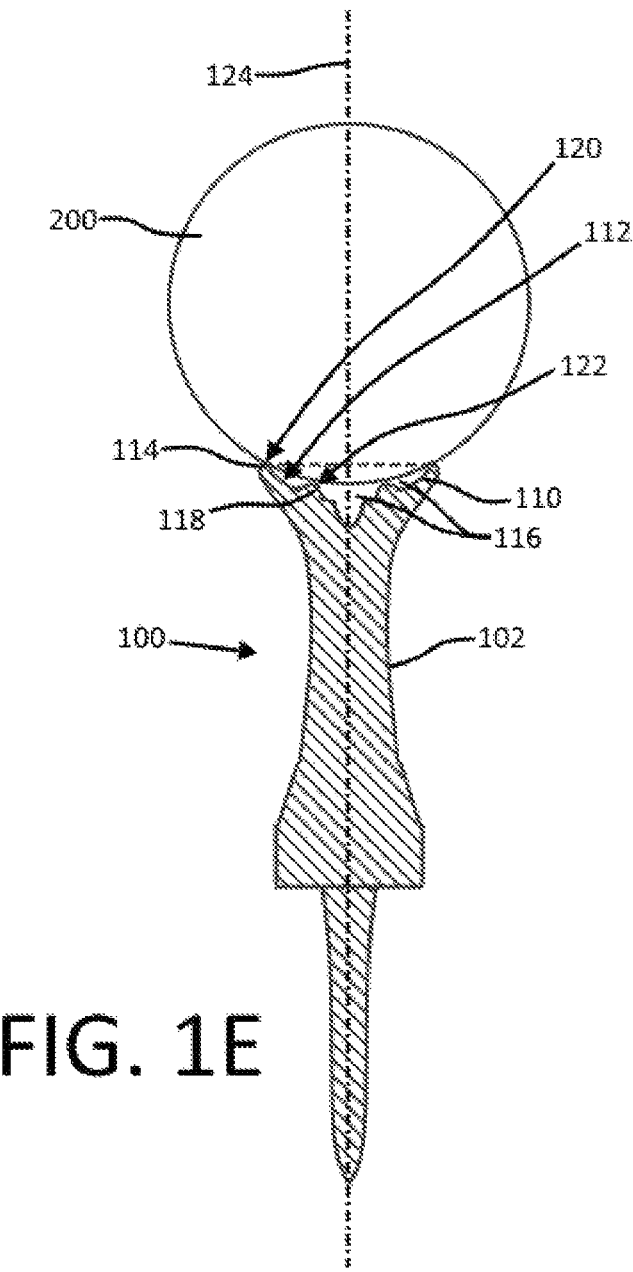
FIG. 1E shows a cross-section view illustration of the golf tee of FIG. 1B along line 1E-1E when supporting a golf ball.

Various aspects are described below with reference to the drawings, and several of the elements are identified by numerals. The relationship and functioning of the various elements may better be understood by reference to the following description. However, aspects are not limited to those illustrated in the drawings or explicitly described below. The drawings are not necessarily to scale, and in certain instances, details may have been omitted that are not necessary for an understanding of aspects disclosed herein.

In this application, the use of the disjunctive is intended to include the conjunctive. The use of definite or indefinite articles is not intended to indicate cardinality. In particular, a reference to "the" object or "a or an" object is intended to denote also one of a possible plurality of such objects.

FIG. 1A shows a top perspective view of a golf tee 100 in accordance with the present disclosure. FIG. 1B shows a side elevation view of the golf tee 100 of FIG. 1A, FIG. 1C shows a top view of the golf tee 100 of FIG. 1A, and FIG. 1D shows a bottom view of the golf tee 100 of FIG. 1A. Referring to FIGS. 1A-1D, the golf tee 100 may include a shaft 102 having a top end 104 and a bottom end 106. The shaft 102 may be formed of any suitable material. In some embodiments, the shaft 102 may be a thermoplastic elastomer (TPE), and may be formed during an injection molding process. The material forming the shaft 102 may be flexible such that the shaft 102 can flex when struck by a golf club, for example, and it may be resilient such that the shaft 102 recoils or springs back into its unstressed shape after bending, stretching, or being compressed. The shaft 102 may include one or more of the depicted indentations 108 extending at least partially around the shaft 102. The indentations 108 may facilitate the bending, stretching, and/or compressing of the shaft 102.

A cup 110 may be located at the top end 104 of the shaft 102. The cup may be formed integrally and with the same material as the shaft 102, or alternatively the cup 110 may be formed separately from the shaft 102 and then attached to the top end 104 of the shaft 102 with a suitable attachment means (such as by screwing, with an adhesive, etc.). The cup 110 may have a concave surface 112, as shown. The concave surface 112 of the cup 110 may face away from the shaft 102 and may be configured to face a surface of a ball (e.g., a golf ball, not shown in FIGS. 1A-1D) when the ball is placed on the golf tee 100. As described in more detail below, at least one protrusion 118 may be located in the cup 110 on the concave surface 112.

FIG. 1E shows a cross-sectional view of the golf tee 100 of FIGS. 1A-1D as it may appear when supporting a golf ball 200. As shown in FIG. 1E, the rim 114 of the cup 110 may be configured (e.g., sized and shaped) such that when the ball is placed in contact with the golf tee 100, the rim 114 contacts the ball 200. For example, when the ball 200 is spherical, the rim 114 may be circular, and may contact the ball 200 at locations where the outer surface of the ball 200 intersects a plane, the plane being perpendicular to a longitudinal axis 124 of the shaft 102.

In some embodiments, at least a portion of (and potentially all of) the concave surface 112 may be spaced apart from the ball 200 when the ball 200 rests on the rim 114. In other words, when the ball 200 rests on the rim 114, a space or gap 116 may be located between the concave surface 112 and the surface of the ball. The space or gap 116 may be advantageous for reducing friction between the tee 100 and the golf ball 200 with respect to a traditional golf tee where a substantially larger surface area typically contacts the outer surface of the ball 200. Additionally or alternatively, as shown, at least one protrusion 118 may extend from the concave surface 112 of the cup 110. The protrusion 118 may be configured (e.g., sized and shaped) such that it contacts the ball 200 when the ball 200 rests on the rim 114.

Any number of protrusions may be included. In an exemplary embodiment, the golf tee 100 may include eight (8) protrusions of equal length and arranged in a circular pattern (shown best in FIG. 1C) such that each of the protrusions 118 contacts the ball 200 when the ball 200 rests on the rim 114 (as shown in FIG. 1E). More or less protrusions may be included (such as, for example, from about one (1) protrusion to about twenty (20) protrusions). It is also contemplated that the protrusions 118 could be arranged in a pattern other than a circular pattern and/or at different heights on the concave surface 112 (which may require different protrusions 118 to have different dimensions). The protrusions may have any suitable shape, and therefore may be hemispherical, cylindrical, rectangular, triangular, pyramid-shaped, or the like.

Referring to FIG. 1C and FIG. 1E, the rim 114 may include a first support surface 120 configured to contact a ball 200 when the golf tee 100 supports the ball, and the protrusions 118 may define at least one second support surface 122 configured to contact the ball 200 when the golf tee 100 supports the ball. The first support surface 120 may be a first distance from a longitudinal axis 124 defined by the shaft 102, such as about 0.37 inches in one non-limiting embodiment. The second support surface 122 may be located a second distance from the longitudinal axis 124 defined by the shaft 102, and the second distance may be less than the first distance. For example, in an exemplary embodiment, the radius (or other distance from the axis 124) of the first support 120 surface may be about 0.75 inches, and the radius (or other distance from the axis 124) of the second support surface 122 may be about 0.4 inches. In other words, the second support surface 122 may be closer to the axis 124 than the first support surface 120.

In the depicted embodiment of FIGS. 1A-1E, the second support surface 122 is formed by the protrusions 118, but it is also contemplated that another suitable structure may be formed on the concave surface 112 to form the second support surface 122. For example, an inner ring or rim (which may be a continuous ring or rim circling the axis 124) may be formed on the concave surface 112. Such an embodiment may be advantageous for providing additional support to for a golf ball and/or for simplicity during manufacturing. Similarly, it is contemplated that the first support surface 120 may be formed by a structure other than a rim 114 (such as, for example, a plurality of outer protrusions).

Advantageously, the golf tee 100 may have a wider rim 114 than traditional golf tees, which may provide enhanced support of a ball. For example, the rim 114 may have a diameter of at least 0.50 inches, at least 0.60 inches, at least 0.70 inches, at least 0.80 inches, at least 0.90 inches, or at least 1.00 inches (or greater). In one non-limiting exemplary embodiment, the diameter of the rim 114 may be about 0.74 inches. Simultaneously, the weight of the ball may be distributed over several contact surfaces such that the static friction force is reduced at each specific contact point. Further, since the concave surface 112 of the cup 110 is spaced from the ball, the total surface area of contact between the ball 200 and the golf tee 100 may be reduced when compared to a traditional tee. The sum of these characteristics may provide reduced spin (i.e., sidespin, backspin, topspin) resulting in longer, more controllable golf shots with fewer unintentional hooks and slices.

Referring back to FIG. 1A, the tee 100 may include a stake or stem 126 extending from the bottom end 106 of the shaft 102. In one non-limiting embodiment, the stem 126 may have a length of about 1.25 inches, though other lengths are also contemplated. The stem 126 is preferably configured to be pressed into the ground by a golfer, and may include a sharpened tip 128 for the facilitation of entry into the ground. The stem 126 may include a material that is different than a material of the shaft 102, and the stem 126 may be attached to the shaft 102 when the shaft 102 is molded, such as by injection over-molding (e.g., a portion of the pre-formed stem 126 may be inserted into a mold during the injection molding process for forming the shaft 102). Other suitable attachment means may also be used (e.g., the use an adhesive). Alternatively, the shaft 102 and the stem 126 may be formed integrally, such as during a single molding process, for example.

The stem 126 may include an elongated body 130 and at least one optional fin or column 132 extending radially outward from the elongated body 130. The column 132 may be configured to engage the ground, and may be advantageous for giving the stem 126 a relatively large surface area and a geometry suitable for providing a high degree of ground engagement and support. Any number of columns 132 may be included. For example, four columns 132 may be included (as best shown in FIG. 1D), but stems with more or less columns are also contemplated. The columns 132 may extend along the entirety of the length of the stem 126, or only along a portion of the length. When compared to a stem without columns, the stem 126 may be relatively secure when placed in the ground such that the stem 126 provides a relatively high resistance to movement and/or rotation of the stem 126 during a golf shot. To further enhance the desirable characteristics of the columns 132, each column 132 may include a notch 134 at its outer edge to provide additional surface contact and engagement between the column 132 and the ground.

In some embodiments, the cross-section of shaft 102 may vary along its length. As shown in FIG. 1A, a central portion 140 of the shaft may include a circular cross section, which may be advantageous for providing suitable bendability and/or flexibility in all directions, for example. The bottom end 106 of the shaft 102 may be shaped with a different cross-section (e.g., with a rectangular cross-section) to include at least one flat surface, such as the depicted flat surface 136. The flat surface 136 may be parallel to the longitudinal axis of the shaft 102, though this is not required. The flat surface 136 may be advantageous for providing an area to place a logo 138 and/or another mark for decorative purposes and/or to provide information to a golfer, such as information conveying the company marketing the golf tee 100, the type and/or size of the golf tee 100, etc. The logo or other mark may be stamped, pressed, printed, molded, or may a portion of an over-molded component that extends to the surface 136, such as an over-molded stem or stake. In one exemplary, non-limiting embodiment, the surface 136 may be rectangular with a width of approximately 0.60 inches and a height of approximately 0.30 inches.

Figure 2:
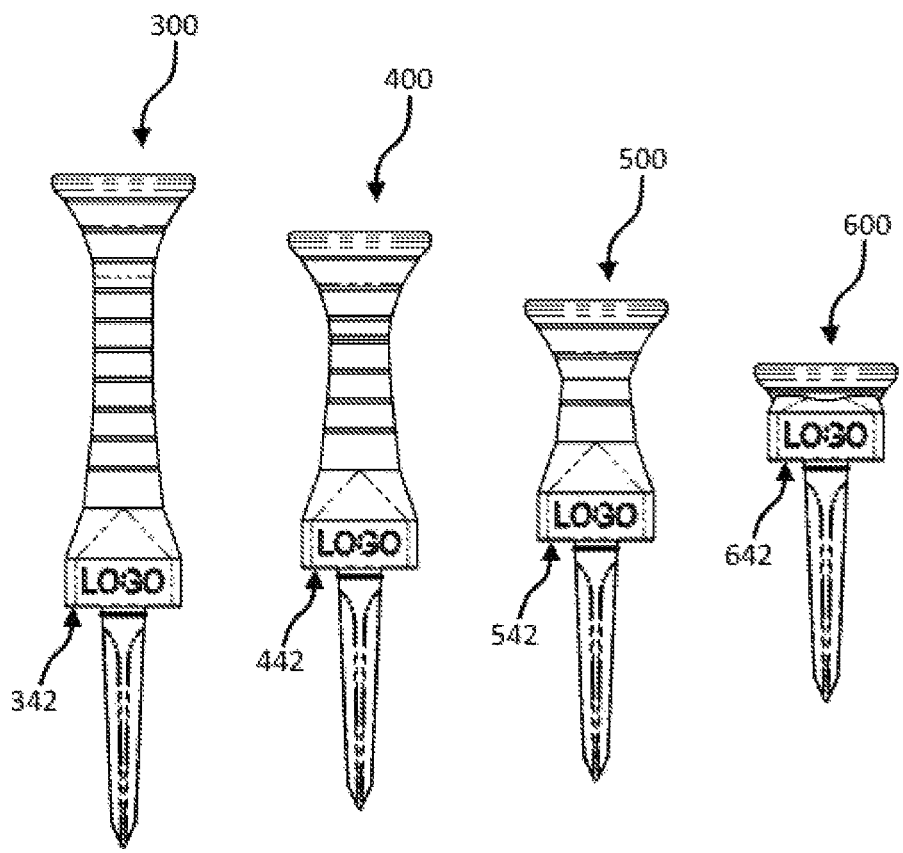
FIG. 2 shows four embodiments of a golf tee in accordance with the present disclosure, where each of the four embodiments has a different shaft length.

FIG. 2 shows four embodiments of a golf tee in accordance with the present disclosure, where each of the four embodiments has a different shaft length. For example (and without limitation), the first golf tee 300 may have a shaft length of about 2.25 inches, the second golf tee 400 may have a shaft length about 1.75 inches, the third golf tee 500 may have a shaft length of about 1.25 inches, and the fourth golf tee 600 may have a shaft length of about 0.50 inches. Providing golf tees with different shaft lengths may be advantageous to accommodate for multiple types of golf shots and/or for multiple swing types. The tees 300, 400, 500, and 600 may each be designed with a shaft length such that a golf ball has a certain elevation during a golf shot. For consistent golf-ball elevation, bottom surfaces 342, 442, 542, and/or 642 may be configured to be pressed against the ground to consistently control the depth of the respective stems, and consequently, the height of the cup. Advantageously, a consistent ball elevation may be achieved quickly and in a consistent and precise manner by a golfer, and may reduce or eliminate cleanup at the tee box.

Referring to FIG. 3, it is contemplated that a golf tee 700 may include protrusions 726 (or other elements forming a contact surface) that have dimensions such that the golf ball 200 does not contact a rim 714 of the golf tee 700 at all. This may be advantageous for further reducing the surface area of contact between the golf ball 200 and the tee 700 with respect to other embodiments. The rim 714, though not in constant contact with the ball 200, may be relatively close to the golf ball 200 such that it may assist (e.g., briefly contact the ball) when placing the golf ball 200 on the tee 300. Optionally, the golf tee 700 may include a second protrusions 727 located further from the axis than the protrusions 726. The second protrusions 727 may form a support surface for contacting the ball 200, and may be included in combination with any of the embodiments and/or aspects described herein.

Specific embodiments of a golf tee have been described for the purpose of illustrating the manner in which the aspects of the present disclosure are used. It should be understood that the implementation of other variations and modifications of the embodiments described herein and their various aspects will be apparent to one skilled in the art, and that the invention is not limited by the specific embodiments described.

We claim:

1. A golf tee, the golf tee comprising:
   a shaft having a top end and a bottom end;
   a cup located at the top end of the shaft, the cup having a concave surface, and the cup having a rim defining a support surface for contacting a ball when the golf tee supports a ball; and
   at least one protrusion extending from the concave surface of the cup, and the at least one protrusion having a second support surface configured to contact the ball when the golf tee supports the ball,
   wherein the at least one protrusion is arranged in a circular pattern on the concave surface.

2. The golf tee of claim 1, further comprising a stem located at the bottom end of the shaft, wherein the stem includes a material that is different than a material of the shaft.

3. The golf tee of claim 2, wherein the stem includes a central elongated shaft and at least one column extending from the elongated shaft and configured to engage a ground.

4. The golf tee of claim 1, wherein the at least one protrusion is configured such that the rim and the at least one protrusion contact a ball when the ball is placed on the golf tee.

5. The golf tee of claim 1, wherein the bottom end of the shaft includes a flat surface, the flat surface being parallel to an axis defined by the shaft.

6. The golf tee of claim 1, wherein a central portion of the shaft has at least one indentation depressed with respect to an outer surface of the shaft and extending circumferentially around the central portion.

7. The golf tee of claim 1, wherein at least a portion of the rim is located a first distance from an axis defined by the shaft, wherein the at least one protrusion is located a second distance from the axis defined by the shaft, and wherein the first distance is greater than the second distance.

8. The golf tee of claim 1, wherein each protrusion of the at least one protrusion has a substantially-circular cross-section.

9. A golf tee, the golf tee comprising:
   a shaft having a top end and a bottom end;
   a cup located at the top end of the shaft, the cup having a rim;
   a first support surface defined by the rim of the golf tee, the first support surface configured to contact a ball when the golf tee supports the ball; and
   at least three second support surfaces defined by at least three protrusions, wherein each of the second support surfaces is configured to contact the ball when the golf tee supports the ball,
   wherein the first support surface is located a first distance from an axis defined by the shaft,
   wherein each of the second support surfaces is located a second distance from the axis defined by the shaft, and
   wherein the first distance is greater than the second distance.

10. The golf tee of claim 9, wherein the rim surrounds a CUP, and wherein the cup has a concave surface facing away from the shaft.

11. The golf tee of claim 10, wherein the at least three protrusions are arranged in a circular pattern.

12. The golf tee of claim 10, wherein a diameter of the rim is at least 0.50 inches.

13. The golf tee of claim 9, further comprising a stem located at the bottom end of the shaft, wherein the stem includes a material that is different than a material of the shaft.

14. The golf tee of claim 13, wherein the stem includes a central elongated shaft and at least one column extending from the elongated shaft and configured to engage a ground.

15. The golf tee of claim 14, wherein an end of the at least one column includes a concave notch.

16. The golf tee of claim 9, wherein the bottom end of the shaft includes a flat surface, the flat surface being parallel to an axis defined by the shaft.

17. The golf tee of claim 9, wherein a central portion of the shaft has a at least one indentation depressed with respect to an outer surface of the shaft and extending around the central portion.

18. A method for forming a golf tee, the method comprising:

forming a shaft having a top end and a bottom end;

forming a cup located at the top end of the shaft, the cup having a concave surface, and the cup having a rim configured to contact a ball when the golf tee supports the ball; and forming at least three protrusions extending from the concave surface of the cup, where the at least three protrusions are arranged in a circular pattern on the concave surface, and where each protrusion of the at least three protrusions includes a surface configured to contact the ball when the golf tee supports the ball.

19. The method of claim 18, further comprising forming a stem and locating the stem at the bottom end of the shaft.

20. The method of claim 19, wherein locating the stem at the bottom end of the shaft includes inserting the stem in a mold before or during an injection molding process, wherein the injection molding process forms the shaft.

* * * * *